Nov. 11, 1941. G. D. WELTY 2,262,074
PISTON AND PROCESS OF MAKING
Filed July 13, 1938 3 Sheets-Sheet 3

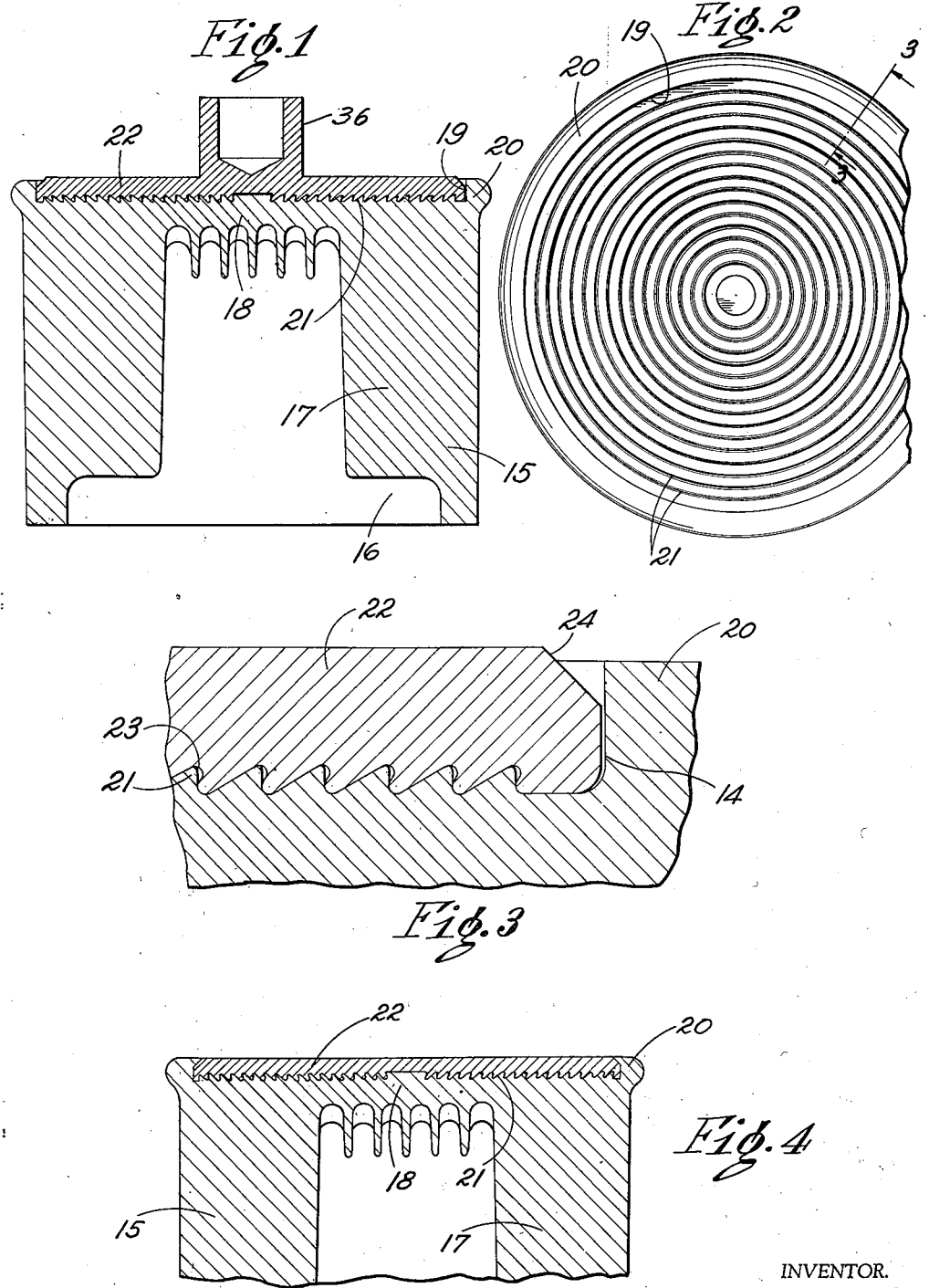

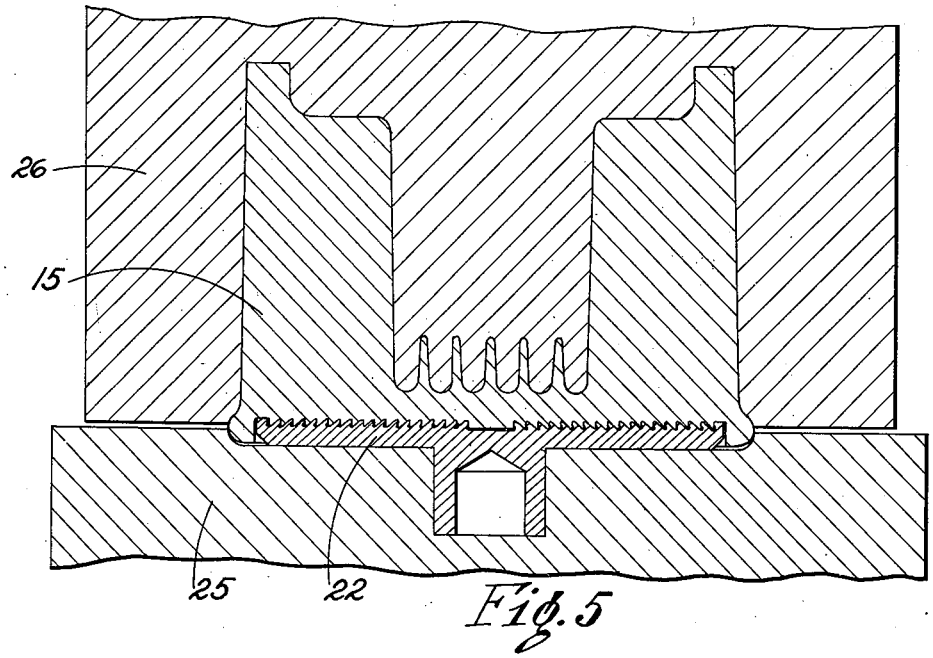
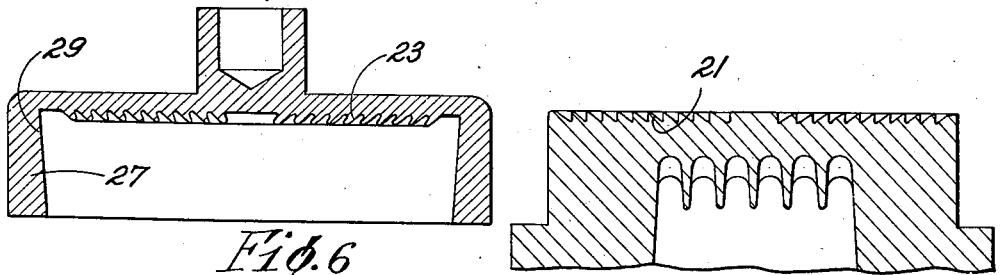
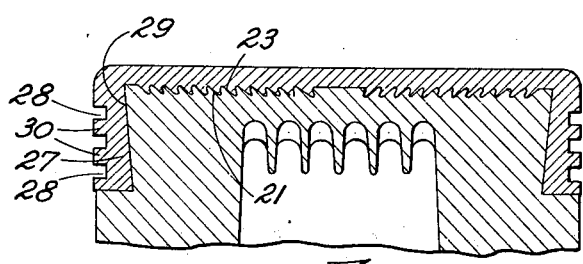

INVENTOR.
GEORGE D. WELTY
BY
ATTORNEYS

Patented Nov. 11, 1941

2,262,074

UNITED STATES PATENT OFFICE 2,262,074

PISTON AND PROCESS OF MAKING

George Donald Welty, Cleveland, Ohio, assignor, by mesne assignments, to The Cleveland Trust Company, Cleveland, Ohio, a corporation of Ohio Application July 13, 1938, Serial No. 219,018

1 Claim. (Cl. 123—193)

This invention relates to internal combustion engine pistons and to a process of making the same, and particularly to pistons subjected to heavy loads and high temperatures as in air-cooled aircraft type engines.

The principal object of this invention is to secure a protecting plate or disk to the upper face of the head of a light metal piston so as to protect the head against burning or erosion with a minimum sacrifice of thermal conductivity. Another object is to secure a protecting member to the upper face of the head of a light metal piston by a forging operation or operations so that the protecting plate or disk is permanently and integrally united to the body of the piston. Another object is to protect the upper surface of the head of a light metal piston against burning or erosion while maintaining the necessary strength in the piston head by means of a chrome-nickel steel, or stainless steel, protecting plate or disk. Another object is to increase the thermal conductivity of the joint between the protecting plate and the body of the piston by forming an alloy bond between these members, as by interposing between them a layer of tin or similar bonding metal. Other objects are to provide alternative specific constructions and processes for permanently securing protecting plates or disks in position on the heads of light metal alloy pistons.

One of the aims in the design of internal combustion engines used in aircraft is to obtain maximum power for the weight of the engine, and to this end such engines are commonly constructed with relatively large cylinders and combustion chambers and in many instances are of the air-cooled type in order to eliminate the weight of a cooling liquid and the necessary jackets and radiators. In such engines the pistons are not only subjected to relatively heavy loads but are compelled to dissipate large quantities of heat. The most satisfactory pistons heretofore available for such engines have been pistons forged from aluminum or other light metal alloys. The high thermal conductivity of the light metal alloy enables the pistons to dissipate heat rapidly and thereby permits the use of larger combustion chambers and higher compression ratios than could be used with pistons composed of other materials.

It has been discovered, however, that in engines of this type the light metal alloy of the piston heads is at times severely burned and eroded by the hot products of combustion. This phenomenon appears to be associated with detonation in the engine, since pistons which give satisfactory service in high powered aircraft engines under normal conditions are found to be rapidly destroyed when the engine is operated with low grade fuel or under conditions causing detonation. Some erosion and burning also occurs in high powered engines even under the best conditions of operation. Even where erosion of the piston head does not continue to the point where the piston is destroyed the reduction in the effective height of the piston reduces the compression ratio and therefore reduces the power output of the engine.

In accordance with the present invention a protecting plate or disk of heavy metal better adapted to withstand the action of the hot products of combustion is secured to the upper face of the head of a light metal alloy piston with a firm mechanical bond, and with an intimate metallic contact so as to reduce the resistance to heat flow from the protecting disk to the body of the piston. I have discovered that a protecting plate of chrome-nickel steel secured to the head of a light metal alloy piston will withstand the eroding and burning effects of the hot gases and at the same time can be pressed into intimate engagement with the light metal alloy of the piston body and can be made sufficiently thin so that the flow of heat from the protecting disk to the body of the piston is not unduly impaired.

I have also discovered that such a protecting plate or disk, or a protecting plate of other material which improves the resistance of the piston head to the action of the hot gases, may be united with the light metal alloy piston so as to obtain a firm mechanical bond and at the same time obtain maximum heat transfer from the protecting plate to the piston body by forming the plate and piston head with suitable mating recesses and projections and flowing the metal of the two parts into intimate interlocking relationship by a forging operation.

In the accompanying drawings:

Figure 1 is a vertical section through a piston blank and protecting plate before the same have been secured together;

Figure 2 is a top plan view of the piston blank shown in Figure 1;

Figure 3 is a fragmentary enlarged section on the line 3—3 of Figure 2;

Figure 4 is a vertical section through the piston after the protecting plate has been secured to the light metal alloy blank;

Figure 5 is a vertical section illustrating somewhat diagrammatically the preferred form of tools for securing the plate to the piston blank;

Figures 6 and 7 are sections through a modified form of protecting plate and piston blank, respectively;

Figure 8 is a section showing the plate and piston blank of Figures 6 and 7 secured together;

Figure 9:
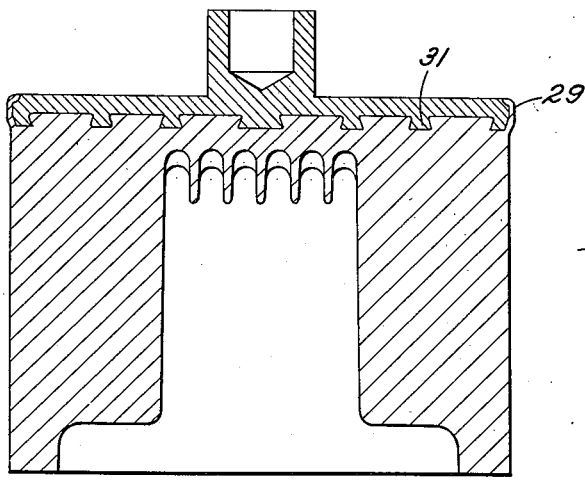
Figure 9 is a section through another modified form of piston and plate.

Referring to the drawings, the invention is preferably carried out by first forging a light metal alloy piston blank such as the blank 15 shown in Figure 1. After the preliminary forging operations have shaped the skirt 16, wrist pin bosses 17 and head disk 18 the upper face of the head disk is preferably machined to provide it with a recess 19, to receive the protecting plate or disk, surrounded by a flange 20. In the preferred embodiment the upper surface of the light metal alloy head is likewise formed with a series of concentric upwardly projecting rings or teeth 21.

A protecting plate or disk 22 is then fashioned of a size to fit within the recess 19. In the preferred embodiment this plate is composed of chrome-nickel steel of any of the various commercial compositions known as stainless steel. I have discovered that this material will answer all of the requirements in that it retains its hardness and resistance to corrosion at the high temperatures encountered in air-cooled aircraft engines, does not erode or burn substantially even under extreme conditions which would rapidly destroy the light metal alloy head, and is of such strength that a relatively thin plate may be employed with substantial reduction of the thickness of the light metal head so that the total weight of the piston is not greatly increased over a piston composed entirely of light metal alloy. However, it will be understood that my improved process is also well suited to securing in place protecting plates or disks of other suitable materials, such as copper, bronze or gray iron.

In the preferred embodiment the plate 22 is provided on its under surface with a series of concentric grooves 23 corresponding generally in shape and position to the rings 21 formed on the head of the piston except that the grooves 23 are undercut so as to have re-entrant sides as shown in Figure 3 so that when the parts are forged together the metal of the piston and the protecting plate 22 will be interlocked and permanently united. The interlocking rings 21 and grooves 23 have a further substantial advantage in that the area of contact between the protecting disk and the light metal alloy of the piston body is greatly increased, and when the parts are forged together the two metals are in intimate contact throughout the relatively large surface provided by the mating rings and grooves so that the resistance to heat transfer from the protecting plate to the piston body is reduced to a minimum.

The plate 22 is also provided with a beveled edge 24 on its upper face so that the flange 20 on the light metal alloy piston may be forged over into interlocking engagement with the upper surface of the plate. Ordinarily a post 36 is formed on the outer surface of the plate 22 to facilitate handling and gripping the plate.

After the piston body and the protecting plate 22 have been formed they are heated to forging temperature and united to each other by a forging operation, preferably in a forging press in the manner illustrated diagrammatically in Figure 5. As shown, the piston and protecting plate 22 are placed upon the matrix or fixed die 25 of a vertical forging press with the head of the piston down. This press is preferably of the type including a vertically reciprocating slide driven by a crank. The slide is provided with a die 26 shaped to receive the skirt and wrist pin bosses of the piston and to co-operate with the fixed die 25. The press is then operated so that the movable die 26 descends, fits around the skirt and wrist pin boss portions of the piston and flows the metal of the head and the flange 20 into intimate engagement with the under cut grooves 23 and the beveled edge 24 of the protecting plate 22.

The piston is thereafter finished by machining operations in the conventional manner, including the removal of the post 36, and when completed the protecting plate 22 is a permanent and integral part of the piston.

Preferably in order to avoid any tendency toward separation of the parts upon cooling after the forging operation, the protecting plate 22 is initially heated to a higher temperature than the forging temperature of the light metal alloy so that it is expanded substantially the same amount the light metal alloy is expanded when the forging operation takes place. As a consequence when the complete piston cools both parts shrink the same amount and remain in tight engagement with each other. In the preferred embodiment in which the plate 22 is composed of stainless steel the co-efficient of expansion of the plate is less than that of the body of the piston. However, the thermal conductivity of the plate is likewise less than that of the light metal alloy and since the plate 22 is exposed directly to the heat of combustion it is heated to, and during operation remains at, a higher temperature than the body of the piston. As a consequence the amount of expansion of the two parts remain about the same during operation in an engine. I have found, however, that with a plate of this type secured in position by a forging operation as described above unequal expansion of the two parts due to the differences in their co-efficients of expansion will not separate the plate from the piston body.

In the preferred embodiment this ability of the assembled unit to resist unequal expansion results in part from the arrangement of the concentric grooves 23 in the plate 22 with their undercut sides disposed on the side away from the center of the plate, as illustrated in Figures 1 and 3, so that the light metal alloy is locked against outward expansion relative to the protecting plate 22 throughout substantially the entire area of the plate. Thus the forces resulting from the difference in co-efficients of expansion simply produce radial compression in the light metal alloy and radial tension in the protecting plate 22 without relative displacement of the metals.

It will be apparent that the particular form of the interlocking parts of the piston body and protecting plate may be varied considerably while still obtaining good mechanical and thermal engagement between the parts by the forging operation. In some instances the protecting plate and the upper surface of the light metal alloy piston body may simply be made flat and the engagement of the two parts at their rims relied upon to maintain a mechanical and thermal connection.

In Figures 6, 7 and 8 I have shown a different arrangement in which the protecting plate is extended radially outward and is provided with a depending flange 27 of sufficient length so that grooves 28 may be formed therein to receive the usual packing rings. This flange is preferably undercut as indicated at 29 so that the light metal alloy is caused to flow into interlocking engagement with the flange. In this embodiment also the upper surface of the light metal alloy body and the underside of the protecting plate are preferably provided with the rings 21 and grooves 23 respectively as described in connection with Figures 1 to 4, inclusive. This arrangement provides another advantage in that the ring lands 30 disposed between the grooves 28 are formed in the relatively strong metal of the protecting plate and are, therefore, much better able to resist battering and breaking than are the usual ring lands formed in the light metal alloy piston.

Another modification is illustrated in Figure 9. In the arrangement shown in this figure the piston blank is provided with a flange 20' similar to that shown in Figures 1 to 4 and the under side of the head is provided with a series of concentric dovetail projections 31, forming dovetail or re-entrant grooves between the projections. The head of the piston blank is formed with correspondingly located concentric grooves of a size to receive the large ends of the dovetail projections 31. This blank and plate are then forged together as previously described so that the flange 29 is secured around the edge of the plate as in the construction shown in Figure 4 and the metal of the head is caused to flow into close fitting engagement with the grooves between the dovetail projections 31.

Figure 10:
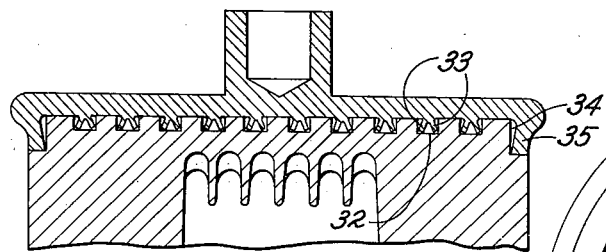
Figure 10 is a section corresponding to Figure 1 of another modification.
Figure 11:
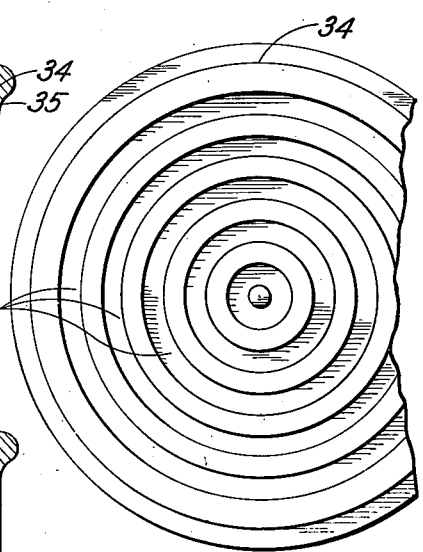
Figure 11 is a top plan view of the piston blank shown in Figure 10.
Figure 12:
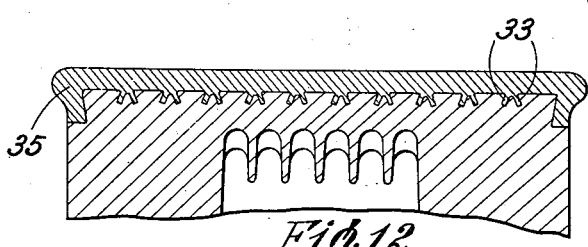
Figure 12 is a section through the piston shown in Figure 10 after the parts have been secured together.
Figure 13:
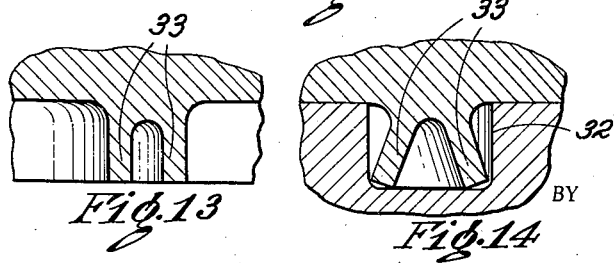
Figure 13 is an enlarged fragmentary section showing a step in the formation of the plate shown in Figure 10.
Figure 14:
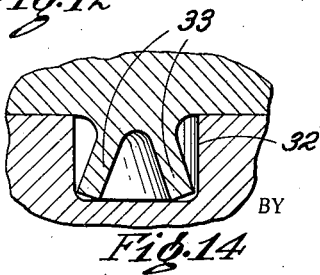
Figure 14 is an enlarged fragmentary section of one groove and projection of the piston shown in Figure 10.

In Figures 10 to 14, inclusive, a further modification is disclosed. In this form the head of the piston is provided with concentric grooves 32 and the under surface of the protecting plate is formed with concentric projecting lands which are grooved so that each projecting land embodies a pair of walls 33. These walls 33 are then spread apart at their lower ends so as to have a dovetailed shape as shown in Figures 10 and 14, leaving re-entrant grooves between adjacent pairs of walls. The parts are then subjected to the forging operation as described above and the light metal alloy head flows between and around the walls 33 so as to provide a firm interlocking engagement as shown in Figure 12, and also a good thermal contact throughout the extensive surface provided by both sides of the walls 33 and the under side of the head disposed therebetween.

In the form shown in Figures 10 to 14 a further modification of the rim structure is illustrated. In this form, as shown in Figure 10, the protecting plate is provided with a depending undercut flange 35 seating in a rabbet 34 similar to the arrangement shown in Figures 6, 7 and 8, except that the flange 35 is relatively short and terminates above the grooves for the packing rings. As in the structure shown in Figures 6, 7 and 8 the engagement of the light metal alloy of the piston body within the undercut flange in the protecting plate provides an additional mechanical interlock between the parts.

It will be apparent that any of the arrangements of the peripheral connection between the protecting plate and the piston head may be used with any of the various forms of interlocking grooves and recesses on the meeting surfaces of the protecting plate and piston body. Likewise, as previously stated, any of the various forms of the peripheral structure may be used with simply flat meeting surfaces between the piston body and the protecting plate, although the interfitting grooves and recesses of some form are preferred not only for the addition of the mechanical interlock which they provide, but because of the great increase in surface contact between the metal of the protecting plate and the light metal alloy of the piston body.

I have also found it advantageous in some instances to provide a layer of tin or similar bonding metal between the contacting surface of the light metal piston body and the protecting plate which may be introduced by simply tinning one or the other of these members before they are assembled, as illustrated at 40 in Figure 3. The forging of the parts together at the forging temperature of the light metal alloy produces an alloy bond between the tin and the metals of the protecting plate and the piston body which further increases the thermal conductivity across the joint between these two members.

It will be apparent that any other suitable type of forging apparatus or process may be employed to forge or press the parts into interlocking relationship. For example, the parts may be forged in a conventional upset forging machine having gripping dies and a horizontally reciprocating header slide. When such a machine is employed it is preferable to assemble the protecting head plate on the piston body while the parts are cold and then heat them until the piston body reaches the desired forging temperature. With the constructions illustrated in Figures 1 to 4, inclusive, 9, and 10 to 14, inclusive, such heating expands the parts sufficiently to hold them together and enable the entire assembly to be picked up and positioned in the forging machine by gripping the post 36 with a suitable tong. The gripping dies are then closed, gripping the post 36 and holding the piston body in position to be struck by a ram in a manner similar to that illustrated in Figure 5. When this process is used in connection with the protecting plate having a flange 35 such as illustrated in Figures 10 and 12, it will be obvious that the entire outer periphery of the cover plate may be gripped in the gripping dies.

It will be apparent that many other variations in the particular contour of the two parts adapting them to be interlocked together by the foregoing operation may be employed and likewise that any specific material found to be desirable for use as a protecting plate on the head of the piston may be secured in position in accordance with this process. Accordingly, I do not wish to be limited except as indicated in the following claim.

I claim:

An internal combustion engine piston comprising integral head and skirt portions formed of light metal alloy and a disk of heavy metal secured to the outer surface of the light metal alloy head portion, said disk having throughout substantially the entire area of its under side a closely spaced series of alternate re-entrant grooves and projections curved about the center of the disk, said projections being generally triangular in cross section with a relatively short side disposed toward the center of the disk and a relatively long side disposed toward the periphery of the disk, and the light metal alloy of the head portion being in intimate engagement with the surfaces of said projections, whereby the light metal alloy of the head portion is formed with projections generally triangular in cross section complementary to the projections on said disc and having relatively short sides facing the periphery of said piston and transmitting radial thrusts resulting from thermal expansion to the projections on said disc, and having relatively long sides integral with the light metal alloy head portion.

GEORGE DONALD WELTY.